2,785,981

METHOD OF MANUFACTURING A CRISPY CARROT PRODUCT

Laurits Dinesen, Minneapolis, Minn.

No Drawing. Application March 24, 1951,
Serial No. 217,399

1 Claim. (Cl. 99—100)

My present invention relates to the manufacture of an improved pre-cooked food product from vegetables which are of the bulbular or spindle-shaped plant root variety and in particular carrots which are more suited for and are preferably used for the purpose.

A particular object of the invention is the provision of a novel method of producing a very tasty and highly nutritive precooked food product from suitable vegetables, such, for example, as the bulbular or spindle-shaped roots of carrots.

Another important objective of the invention is the provision of a novel method or process of producing from vegetables an improved precooked food product retaining an exceptional high percentage of the taste and nutrition components of the fresh vegetable from which it was produced and including the valuable vitamin content of the fresh vegetable.

Another important objective of the invention is the provision of a method or process of producing an improved precooked food product from vegetables, said product having, in addition to the above-noted and other highly desirable characteristics, a crispy, crunchy consistency.

The above and other highly important objects and advantages of the invention will become apparent from the following specification and claim.

A preferred method of manufacturing the improved food product from fresh carrot roots is as follows: First I select a suitable quantity of fresh raw carrots, preferably of high quality, and wash these to free the same from all dirt and foreign matter. Next, I produce from the selected and washed fresh carrots a rather thick non-pouring raw carrot paste, this being readily accomplished in a composite step comprised as follows:

(A) The fresh raw carrot roots are first subject to comminution to break the same down to relatively coarse particle size without cooking and while in a raw stage, various comminuting devices or grinders being suitable for this purpose.

(B) This first comminution product is now subject to further comminution to break the same down into very fine particle size, and this may be achieved through the use of commercially available machines known as liquifiers and which are commercially employed for reducing fresh raw vegetables to a liquid state for beverage purposes. The coarse ground product of step A is subject to the action of high speed revolving knives in these so-called liquifiers and is reduced to what may be termed an emulsion, but which is, nevertheless, a thick-pouring liquid. Except in cases where the fresh carrots or other vegetables have an exceptionally high moisture content, the coarse ground product of step A will usually be diluted somewhat prior to or during step B by the addition of a small amount of water or pure vegetable juice retrieved from a previous batch.

(C) The thick pouring liquid of step B is next reduced to a thick non-pouring paste-like substance by removal of excess moisture therefrom; this being most conveniently accomplished by pouring the thick liquid over a fine screen and allowing the excess water or juice to drain away through the screen.

A starchy binder is now added to the thick fresh vegetable paste to produce a moldable raw vegetable dough suitable for cooking. Among the starch binders suitable for this purpose are wheat flour, potato flour, rice flour, and plain starch. During this step, a suitable leaven, such as baking powder or yeast, and a suitable flavoring, such as salt, is added, along with the starchy binder, and of course the aggregate is thoroughly mixed.

Next, the moldable raw vegetable dough is divided and reduced to shapes and sizes for thorough cooking, usually by extrusion or rolling. By extruding the dough, spaghetti-like shapes are produced, and by rolling small chunks or pieces of the dough, flakes, similar to potato chips are produced.

Next, the shaped pieces of dough are thoroughly cooked to a crispy, crunchy consistency, and when carrots and similar vegetables are used, the cooked product will have a golden brown color. Preferably, this cooking step is accomplished by deep frying in a suitable fat heated to high temperature and for which purpose commercially-available vegetable oil will most generally be used.

In preferred practice, I extrude or roll the dough directly into a vat of hot deep frying oil, so as to speed up the process and eliminate handling of the sticky dough. In other words, in the case of extrusion, the dough is discharged from the extruding orifice directly into the deep frying liquid, and in the case of rolling, the chips are discharged from the rollers directly into the deep frying liquid.

Preferably, the above referred to moisture removed from the second comminution product in each cycle is added to the first comminution product of a succeeding cycle, whereby the otherwise loss of valuable mineral and vitamin components of the first vegetable is substantially minimized.

Precooked food products made from fresh raw carrots, in accordance with the method above described, have a decidedly pleasing carrot flavor, are very nutritious, retain a very high percentage of the valuable mineral and vitamin content of the raw carrot, and have a very desirable crispy, crunchy consistency and a golden brown color.

My invention has been thoroughly tested and found to be completely satisfactory for the accomplishment of the objectives set forth.

What I claim is:

The method of manufacturing a crispy food product which comprises the following successive steps carried out under substantially normal room temperatures, comminuting a quantity of fresh raw carrots to a fine particle size, adding a starchy binder to said fine particles of fresh raw carrots to produce a raw uncooked thick pouring paste-like carrot batter, extruding said raw uncooked batter directly into deep frying oil heated to a temperature for rapid deep frying of the previously raw uncooked carrot batter, and removing the extruded carrot product from the deep oil after it has reached a thoroughly cooked crispy consistency.

References Cited in the file of this patent

UNITED STATES PATENTS

| | | |
|---|---|---|
| 1,868,183 | Sweet et al. | July 19, 1932 |
| 2,118,391 | Allain et al. | May 24, 1938 |
| 2,160,902 | Raymond | June 6, 1939 |
| 2,168,246 | Shepherd | Aug. 1, 1939 |
| 2,401,392 | Ware et al. | June 4, 1946 |
| 2,512,591 | Alexander | June 27, 1950 |